July 9, 1935.　　　A. A. LINSELL　　　2,007,654
DIRECTION FINDING SYSTEM
Filed April 6, 1933
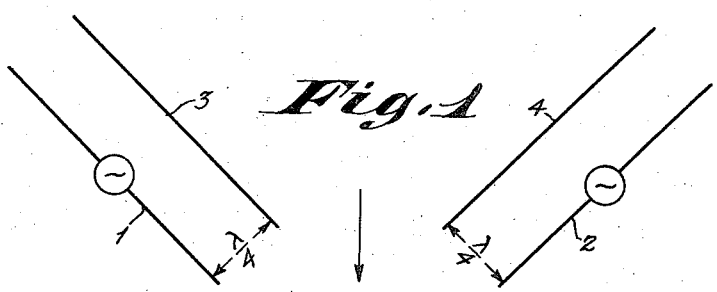
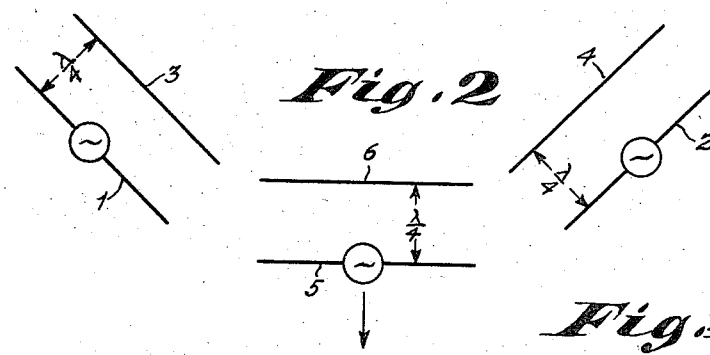
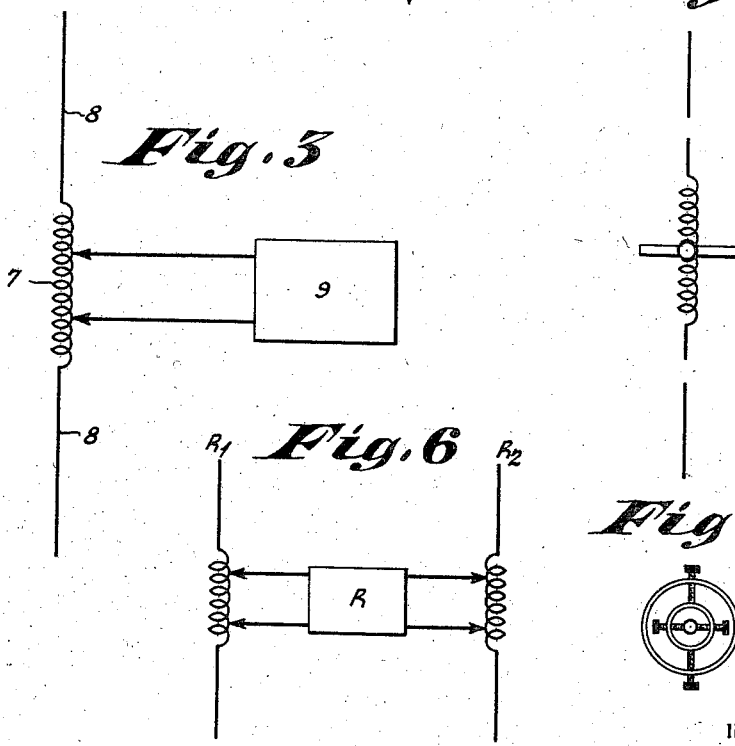
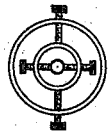
INVENTOR
*ALFRED A. LINSELL*
BY
ATTORNEY Patented July 9, 1935

2,007,654

UNITED STATES PATENT OFFICE 2,007,654

DIRECTION FINDING SYSTEM

Alfred Aubyn Linsell, Sydenham, London, England, assignor to Radio Corporation of America, a corporation of Delaware Application April 6, 1933, Serial No. 664,789
In Great Britain April 23, 1932

8 Claims. (Cl. 250—11)

This invention relates to direction finding systems for use in connection with aircraft and more particularly to transmitters for use in connection with the transmission of signals for the directional navigation of aircraft. It is common practice at the present time for pilots of aircraft flying recognized commercial routes to obtain their whereabouts and generally to receive navigational assistance by transmitting signals which are picked up by two or more direction finding wireless stations suitably positioned on the ground, these wireless stations taking the bearings of the received signals, plotting them on a map to discover the location of the aircraft sending said signals, and then informing the pilot of his whereabouts. The wave length ordinarily employed at the present time for radio transmission in connection with aircraft is 900 meters and one serious difficulty met with is that, owing to reflection effects which take place from the so-called Heaviside layer, some of the energy from the aircraft transmitter may reach the direction finding stations from directions other than the direct path and in consequence cause errors in the readings. Numerous attempts have been made to overcome this difficulty; for example, in one known arrangement means are provided whereby a receiver is caused to be sensitive only to the first of a series of repetitions, all but the first of which may be, due to reflections, of the same signal. It has also been proposed to employ so-called Adcock aerials such as has been disclosed in British Patent No. 130,490 of 1919. For purposes of aircraft navigation, however, such arrangements present the serious disadvantage of complexity and the principal object of this invention is to obviate, in cases where the path between aircraft and receiving station is such that the direct ray can be received, the above mentioned difficulties due to reflection in a simple and practically advantageous manner.

According to the main feature of this invention an aircraft wireless transmitter for use in connection with navigation as above set forth is arranged and constructed to operate on a wave length below the lowest which is subject to reflection from the Heaviside layer; i. e., the transmitter operates on a wave length below about 8 to 9 meters. It is believed that in no circumstances likely to be met with in practice does reflection of wave lengths shorter than 8.7 meters occur.

Preferably the transmitter is so arranged that there is substantially no radiation vertically upwards from the transmitter. This is of considerable advantage from the point of view of economic use of energy in the case of a short wave transmitter in accordance with the main feature of this invention, and, as will be seen later, is of great advantage in reducing difficulties due to reflection, the main object of this invention, even if long wave transmission, on 900 meters' wave length, say, is resorted to. Thus, a second feature of the invention resides in suppressing upward radiation from an aircraft transmitter whether that transmitter be a short wave or a long wave transmitter. It is also highly desirable that the energy transmission from the aircraft shall be substantially or approximately uniform, i. e., non-directional in the horizontal plane.

As regards the main feature of the invention, the ground wave from a short wave transmitter, operating on a wave length of 8.7 meters or less, is rather rapidly attenuated and with such a wave length the range does not extend very much further than the horizon. However, assuming the aircraft to be flying at a height of 6000 feet the horizon would be at a distance of the order of 90 to 100 miles and the ground wave might be presumed to travel another 10 to 20 miles further before becoming too seriously attenuated for practical reception. The range may be still further extended, of course, by building the aerial systems of direction finding receivers at high levels; for example, if a direction finding station were erected on a hill about 400 feet above the surrounding land and its aerial were supported on 100 feet masts a further and additional increase of range of 35 to 40 miles or thereabouts might be obtained. Such a range is adequate for navigation purposes on many commercial aircraft routes; for example, Brussels, Paris, and Croydon all lie within a circle of 150 miles' radius.

As above stated, it is preferred so to construct the aircraft transmitter that radiation upwards is substantially prevented. The reason for this, in the case of a short wave transmitter, is to economize in energy for, since with the short waves in question, no reflection from the Heaviside layer occurs, any energy transmitted upwards would be wasted. The aircraft transmitter should therefore be so constructed as to give a transmission diagram having as nearly as possible no upward components; e. g., the diagram may be substantially hemi-spherical, or cardioid, or of fan shape pointing downwards. Suppression of upwards radiation in the case of the longer wave transmission, 900 meters or thereabouts, is also very desirable from the point of view of reducing reflection errors because upward radiation may reach the receivers on the ground after being reflected only once and being therefore relatively strongly received will tend to give rise to errors in direction reading. By suppressing upward radiation in the case of the long wave transmission such errors are largely reduced since, although radiation may reach the ground, be reflected therefrom to the Heaviside layer and then be reflected to the receivers on the ground, such doubly reflected radiation will not give rise to serious errors of reading since such radiation will, of course, be much less strong at the receiver than either the direct radiation or radiation which had only been reflected once, the avoidance of this last mentioned radiation is therefore of considerable importance.

The novel features of my invention have been set out with particularity in the claims appended hereto. The nature of my invention and circuit arrangements for carrying out the same have been shown in the drawing throughout which like reference characters indicate like parts and in which Figures 1 and 2 show diagrammatically radiating systems arranged in accordance with the present invention.

Figure 3 illustrates the manner in which a radiating system is energized.

Figures 4 and 5 show the manner in which a radiator may be mounted for universal movement; while, Figure 6 illustrates a receiver for receiving signals from the radiating system shown in the prior figures.

In one way of carrying out the present invention an aircraft transmitter is arranged to give a heart shaped radiation characteristic with the maximum radiation vertically downwards. This gives a close approximation to the desired hemispherical radiation characteristic and may be obtained in manner well known per se by a combination of frame and open aerials coupled to a high frequency source, the extent of coupling and phase relationship of the current in the two aerials being so adjusted that the desired cardioid diagram is obtained. If desired, two such radiation systems may be employed in planes at right angles to one another, both having their maxima pointing vertically downwards.

Another arrangement more suitable for use where very short wave lengths are in question is illustrated schematically in the accompanying Figure 1 and comprises two dipoles 1, 2, positioned at about 90° to one another and at 45° to the vertical, the V opening upwards, reflectors 3, 4, being positioned behind the dipoles, one behind each, at a distance of a quarter wave length, $$\frac{\lambda}{4},$$

therefrom, so that vertically upward radiation is substantially suppressed.

In a modification illustrated in the accompanying Figure 2, of the last described arrangement, three dipoles 1, 2, 5 with associated reflectors 3, 4, 6 are employed instead of two, there being a central horizontal dipole 5 with its reflector 6 vertically above it, and a dipole and reflector at each end thereof, the dipoles and reflectors at the ends of the central dipole and reflector being at 90° to one another and at 45° to the vertical, as above described.

If desired, either of the two dipole systems just described may be duplicated, there being provided two similar dipole systems at right angles to one another so as to give an approximately hemi-spherical downwardly pointing radiation diagram.

Another construction in accordance with this invention is illustrated diagrammatically in the accompanying Figure 3 wherein is shown a dipole type aerial having an interposed central inductance 7 which serves to tune the dipole and whose provision enables the lengths of the radiator portions 8 to be reduced to a convenient size. Energization is effected from a high frequency source 9 tapped as shown upon the inductance 7.

If the working wave length is such that distortion of the radiation diagram is likely to be caused by re-radiation from nearby bracing wires or the like of the aeroplane on which the aerial is mounted means, known per se, should be provided for eliminating or reducing such distortion. Such means may comprise insulators interposed in the bracing wires, or, in extreme cases the transmitter may be coupled to the bracing wires to introduce therein oscillations equal and opposite to those induced from the dipole aerial. The dipole aerial is mounted in a vertical position in the aeroplane and will provide a substantially uniform radiation characteristic in the horizontal plane, assuming no distortion of the characteristic by bracing wires and so forth. Preferably a gimbal mounting arrangement as shown schematically in Figures 4 and 5 is employed so that the apparatus can swing into the vertical position under practically all conditions of flying and notwithstanding the tilt or inclination of the aeroplane. Preferably, also, the gimbals are damped to prevent the aerial swinging violently about. In place of using a gimbal mounting means may be provided in association with an arrangement as illustrated in Figure 3, or in association with any other arrangement in accordance with this invention wherein substantially zero upward radiation is obtained, for holding the transmitter inoperative except when the aircraft upon which it is fitted is flying on an even keel, i. e., is substantially level, or within predetermined limits on either side of the level position. Such means may, for example, comprise a switch controlled by a pendulum which is supported in gimbals, the pendulum switch being arranged to close a contact causing the transmitting oscillator to become operative only when the pendulum is in a position corresponding to an approximately horizontal position of the aircraft.

Signals from transmitting arrangements in accordance with this invention can be satisfactorily received by the ordinary usual arrangements of Bellini-Tosi aerials or rotatable frame aerials so long as the angle between the line joining the aircraft and the receiver makes only a relatively small angle with the horizontal, i. e., when the aircraft is some distance away from the receiver or, if close thereto, is at a low altitude. In other circumstances, however, it may be desirable to employ a receiving aerial arrangement of the Adcock type or a frame aerial which can be tilted in a vertical plane, as well as rotated in a horizontal plane, or a system as illustrated in the accompanying Figure 6, wherein there are provided two receiving dipoles $R_1$, $R_2$ which are arranged to feed into a differentially arranged receiver R and can be tilted in a vertical plane.

Having thus described my invention and the operation thereof, what I claim is:

1. A radiating system to be used on aircraft to direct a beam of energy in the desired direction therefrom comprising, pairs of dipole radiators arranged on said aircraft at an angle with respect to each other and to a horizontal plane when said craft is on an even keel, and a linear reflector parallel with each radiator.

2. A radiating system to be used on aircraft to send a beam of radiant energy therefrom in a downward direction comprising, pairs of dipole radiators arranged on said aircraft at an angle with respect to each other and to a horizontal plane when said craft is on an even keel, and a reflector for each radiator, each reflector being parallel with its radiator and spaced therefrom one-quarter wave length.

3. A radiating system to be used on aircraft to send therefrom a beam of radiant energy in the desired direction comprising, a pair of radiators of the dipole type fixed to said aircraft at an angle of 90° with respect to each other and at an angle with respect to a horizontal plane when said craft is on an even keel, means for energizing each of said dipoles, and a reflector for each dipole, each of said reflectors being one-quarter wave length from its dipole.

4. A radiating system to be used on aircraft to direct a beam of energy in the desired direction therefrom comprising, a pair of dipoles fixed on said aircraft at an angle with respect to each other and to a horizontal plane when said craft is on an even keel, the apex of said angle pointing in the direction in which it is desired to radiate maximum energy, a reflector mounted adjacent each dipole, each reflector being one-quarter wave length from its dipole, and means for energizing said radiators.

5. A radiating system to be used on aircraft to send radiant energy in the desired direction therefrom comprising, a linear radiator, a pair of additional linear radiators each mounted at an angle with respect to said first named linear radiator and to each other, a separate reflector for each of said radiators, and means for energizing said radiators, said radiators and reflectors being mounted on said aircraft.

6. A device as recited in claim 5 in which the reflectors are mounted at one-quarter wave length from the respective radiators.

7. A directive radiating system comprising a linear conductor having radiating portions separated by a lumped inductance through which said radiator may be energized and a universal mounting supporting said radiator at the electrical center of said lumped inductance.

8. An arrangement as recited in claim 1, in which said radiators are at an angle of 90° relative to each other and in which said radiators are at an angle of 45° with respect to a horizontal plane when said aircraft is on an even keel, to produce radiation normal to said plane.

ALFRED AUBYN LINSELL.